United States Patent

[11] 3,628,141

[72] Inventors Russell B. Union
Mountain View;
Donald J. Nagy, San Jose, both of Calif.
[21] Appl. No. 877,302
[22] Filed Nov. 17, 1969
[45] Patented Dec. 14, 1971
[73] Assignee Advanced Digital Research Corporation
Los Altos, Calif.

[54] SELF-CONTAINED PROBE FOR DELINEATING CHARACTERISTICS OF LOGIC CIRCUIT SIGNALS
13 Claims, 7 Drawing Figs.

[52] U.S. Cl. .................................................. 324/72.5,
324/73, 324/133
[51] Int. Cl. ........................................................ G01r 31/02
[50] Field of Search .......................................... 324/72.5,
73, 133, 158; 340/248

[56] References Cited
UNITED STATES PATENTS

| | | | |
|---|---|---|---|
| 2,094,645 | 10/1937 | Foulke .......................... | 324/72.5 X |
| 2,632,785 | 3/1953 | Knopp .......................... | 324/133 X |
| 3,525,939 | 8/1970 | Cartmell ....................... | 324/72.5 X |

Primary Examiner—Michael J. Lynch
Attorney—Flehr, Hohbach, Test, Albritton & Herbert ABSTRACT: A self-contained probe for delineating the characteristics of logic circuit signals includes a "0" and "1" logic level circuit portion for indicating the absolute logic level of the monitored signal and a change of state portion which includes a JK flip-flop for alternately illuminating two light source indicators to indicate, for example, pulse repetition rate.

Patented Dec. 14, 1971
3,628,141
2 Sheets-Sheet 1
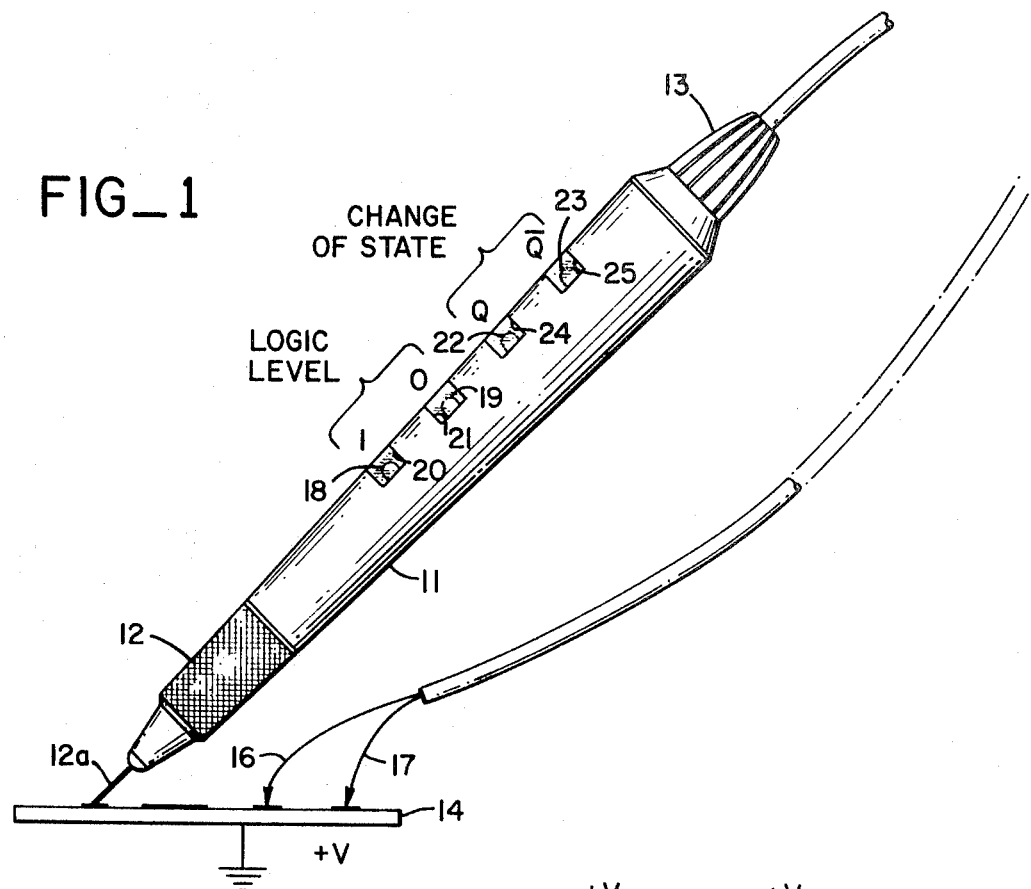
FIG_1
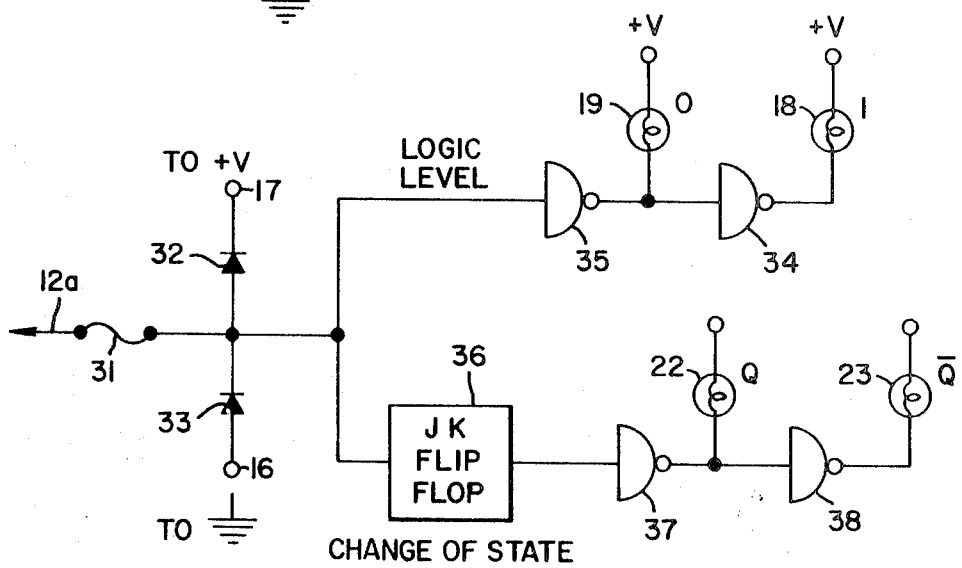
FIG_2
INVENTORS
RUSSELL B. UNION
DONALD J. NAGY
BY
Flehr, Hohbach, Test,
Albritton & Herbert
ATTORNEYS PROBE INDICATION OSCILLOSCOPE PRESENTATION
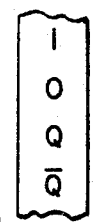
| I | ON |
| 0 | OFF |
| Q | ON | TOGGLING
| Q̄ | ON |
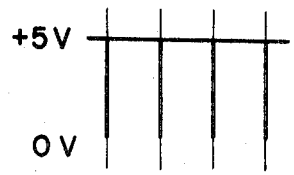
FIG_3A
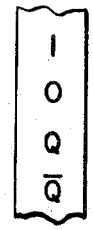
| I | OFF |
| 0 | ON |
| Q | ON | TOGGLING
| Q̄ | ON |
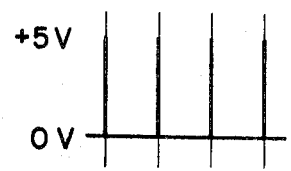
FIG_3B
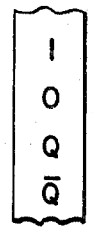
CHANGE OF STATE
| I | OFF | ON |
| 0 | ON | OFF |
| Q | ON | OFF |
| Q̄ | OFF | ON |
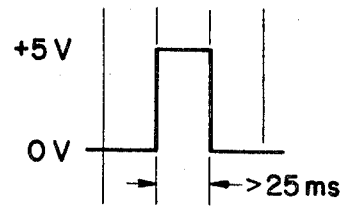
FIG_3C
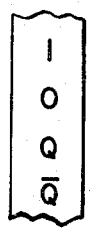
CHANGE OF STATE
| I | OFF | ON |
| 0 | ON | OFF |
| Q | ON | OFF |
| Q̄ | OFF | ON |
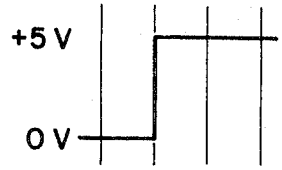
FIG_3D
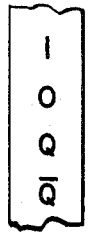
CHANGE OF STATE
| I | ON | OFF |
| 0 | OFF | ON |
| Q | ON | ON |
| Q̄ | OFF | OFF |
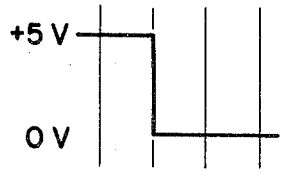
FIG_3E
INVENTORS
RUSSELL B. UNION
DONALD J. NAGY
BY
Flehr, Hohbach, Test,
Albritton & Herbert
ATTORNEYS

SELF-CONTAINED PROBE FOR DELINEATING CHARACTERISTICS OF LOGIC CIRCUIT SIGNALS

BACKGROUND OF THE INVENTION

The present invention is directed to a self-contained probe and more particularly to a probe for delineating the characteristics of logic circuit signals.

Signal speeds of 1.5 nanoseconds per foot are fundamental to the conducting materials of logic circuits. Detection circuits in order to be usable with today's high-speed computers must have the signal lines as short as possible between the signal and the detection circuit. Oscilloscope leads are normally 3 feet long and therefore unusable. Thus, a self-contained probe is necessary to eliminate long cabling distances which includes both the detection circuits and a short probe tip for contacting the test point of the circuit. However, the self-contained probe must still adequately indicate all the necessary characteristics of the logic circuit signals being analyzed. This is especially necessary in integrated circuit analyzation, noise detection applications, medium and large scale integration diagnosis, and in environmental applications.

In all of the above applications, high-speed performance is necessary with a circuit which is compact in order to be self-contained and inexpensive.

OBJECTS AND SUMMARY OF THE INVENTION

It is, therefore, a general object of the invention to provide a self-contained probe for delineating the characteristics of logic circuit signals.

It is another object of the invention to provide a probe as above which has high-speed performance but yet is compact and inexpensive.

In accordance with the above objects there is provided a self-contained probe for delineating the characteristics of a signal being monitored. This probe comprises indicating means having two conditions contained in the prove for indicating the logic level of the signal. Means are contained in the probe for driving the above indicating means with means included for placing the indicating means in one of its conditions when the signal is greater than a predetermined level and in the other condition when the signal is less than the level. Means are also contained in said probe for indicating a change in the logic level of the signal. Means contained in the probe are provided for driving these indicating means including means for switching the indicating means between its two conditions in response to a change in the logic level.

BRIEF DESCRIPTION OF THE DRAWINGS

FIG. 1 is a perspective view of a probe embodying the present invention and showing its use with a typical integrated circuit;

FIG. 2 is a schematic circuit diagram of the circuit contained by the probe of FIG. 1; and FIGS. 3A–3E illustrate the indications of the probe with various types of input signals.

DESCRIPTION OF THE PREFERRED EMBODIMENT

The self-contained probe of the present invention is shown in FIG. 1 and consists of three portions; a barrel portion 11, a probe cap portion 12 with a conductive tip 12a less than 1 inch in length, and an end connection portion 13. Probe cap 12 normally includes a fuse and is removable from the barrel portion to provide for easy fuse replacement. The purpose of the fuse is to protect against accidental application of the probe to high or extraneous voltage points within or near the circuit under test.

End connection portion 13 is also removable to allow for easy storage of barrel portion 11 and probe cap 12 and couples the circuitry of the probe to a positive voltage point and to a common ground. These two points, ground and +V may be external to the circuit being monitored or as illustrated be attached to the actual circuit which is illustrated as an integrated circuit substrate 14. Thus, the lead 16 is indicated as being coupled to the ground of the circuit and lead 17 to a positive voltage logic level which, for example, would normally be a positive 5 volts. Ground may also be external but it must be referenced to the circuit under test thereby establishing a common ground plane. In actual practice, the actual supply voltage may be within the range of 3 to 7.5 volts. The probe tip 12a is placed on the integrated circuit 14 at the point at which a signal is desired to be monitored.

Contained within the probe itself are first and second indicating means which are in the form of light sources 18 and 19 which appear at windows 20 and 21 of the barrel 11. These are for the purpose of indicating the logic level of the monitored signal; the two logic levels are normally designated "1" and "0." Similarly, also contained in the probe are indicator devices to indicate a change of state in the logic level of the monitored signal. These indicating means include light source 22 and 23 which are located in the windows 24 and 25 of barrel 11. These indicators are normally designated with the change of state legends Q and $\overline{Q}$.

Referring now to FIG. 2 the circuitry for driving the various indicating devices is shown coupled to the conductive probe tip 12a. Directly coupled to the probe tip is a fuse 31 which in combination with the diodes 32 and 33 provide for protection against high voltages which might be accidentally applied to the probe. Diode 32 has its other terminal 17 coupled to a positive voltage source and diode 33 has its other terminal 16 coupled to the ground of the integrated circuit being monitored as discussed above. The +V supply is also utilized for the remainder of the circuit of FIG. 2.

The logic level actuating circuit for indicators 18 and 19 forms one branch of the circuit which is coupled to probe tip 12a and between the diodes 32 and 33 and the change of state indicators 22 and 23 form the other branch as so indicated.

Referring specifically to the logic level branch an inverter 34 is series connected between indicators 18 and 19 which have their other terminals connected to the +V voltage source. In addition, a second inverter 35 provides for buffering and inversion of the signal applied to it.

The change of state branch of the probe circuit includes a JK flip-flop 36 which has an input coupled to the probe tip 12a through fuse 31 between diodes 32 and 33 and has an output coupled through an inverter 37 to light source 22. A second inverter 38 again series connects the light sources 22 and 23.

All of the circuit components shown in FIG. 2 are, of course, contained within the probe casing of FIG. 1 which includes barrel 11, probe cap portion 12 and connector 13. From a response standpoint, the logic level portion of the circuit of FIG. 2 is limited to the response of the light sources 18 and 19 which are on the order of 25 milliseconds. Thus, the signal monitored must have a pulse width of at least approximately 25 milliseconds in order to be accurately indicated on the logic level indicators. On the other hand, the change of state indicators 22 and 23 are not limited by their inherent speed since the JK flip-flop has a response time of approximately 5 nanoseconds. Thus, very short pulses having a pulse width of greater than 5 nanoseconds will be reflected in a change of condition of the JK flip-flop. From a response standpoint, therefore, the response to a change of logic level is at least an order of magnitude faster than the response of the logic level portion of the circuit. The flip-flop 36 also causes the change of state circuit branch to operate in a bistable mode with the logic level branch being monostable. If desired the response time of the entire circuit can be significantly reduced. For example, the light source indicators may be light-emitting diodes which have a response of the order of 1 nanosecond. Also changing the type of JK flip-flop can decrease the change of logic level response time to the picosecond range. Thus the entire circuit can have a response time of 1 nanosecond.

The flip-flop in the present embodiment is arranged so as to switch conditions with a change in the input signal from a "0" to a "1" logic level. This, therefore, causes a toggling of the indicating lights with one light being illuminated and the other darkened. A change from a "1" to a "0" level does not change the state of the flip-flop.

In operation, the combination of indications from the logic level indicators 18, 19 and the change of state indicators 22, 23 provide information as to the type of signal being monitored FIGS. 3A through 3E indicate typical signals as they would appear in an oscilloscope presentation and the accompanying probe indication. It is assumed that the voltage amplitude of the signal varies between 0 and +5 volts as indicated.

In FIG. 3A the monitored signal consists of a number of very short pulses or spikes of perhaps a few nanoseconds (5 or greater, however). The absolute level indicated as a "1" since this is the base level of the pulse (in other words, 5 volts) and the Q and $\overline{Q}$ change of state indicators are toggling or switching on and off with each pulse. The logic level remains on "1" since the pulse duration is too short to be reflected in the 0 indicator.

In FIG. 3B, the signal spikes are now on a 0 volt base level and this is reflected in the change of state indicator showing ON for "0" logic level. However, again the change to the 5 volt or "1" logic level is not reflected because of the short time duration of the spike-type signal. Thus, FIGS. 3A and 3B illustrate how the probe indication delineates a characteristic of the monitored signal where the pulse repetition rate is illustrated by the toggling rate and the base reference level by the logic level indicators.

The relatively slow response of the logic level indicators as shown above is advantageous in rejecting noise. Since a noise signal may have a significant vertical or voltage magnitude it may trigger the change of state indicators. However, because of horizontal time base being in the nanosecond range the logic level indicators are unaffected. Thus, where it is known that the logic circuit under test has no legitimate test signals in the nanosecond range it is obvious that the Q and $\overline{Q}$ circuit is being triggered by noise.

Yet another protection against spurious noise pulses is the fact that the circuit of the present invention has a low-input impedance of 1,200 ohms. This normally causes the probe to act as a 4 milliampere current sink to in effect eliminate noise spikes.

FIG. 3C illustrates the change of logic level where the pulse is greater than 25 milliseconds. The "1" logic level has a change of state from an OFF to an ON condition due to the change from a 0 to a 5 volt level. The Q and $\overline{Q}$ change of state indicators switch with the change from 0- to the 5-volt level.

FIG. 3D shows a positive step function from a "0" logic level to a "1" logical level which is reflected in the logic level indicator and also since it is going step toggles the Q and $\overline{Q}$ outputs of the flip-flop. Finally, FIG. 3E is the opposite of FIG. 3D indicating the change from a "1" to a "0" logic level which while reflecting the change of logic level has no affect on the Q and $\overline{Q}$ outputs since the flip-flop is not responsive to negative going logic level changes.

Other characteristics of a monitored signal may also be determined by the present invention. For example, if a square wave is applied to the probe, the total drive applied to the logic level indicators, in other word "1" and "0" indicators, is the same and therefore both indicators illuminate equally. If however, the pulse width and rest time of the signal are varied in relation to each other, the brilliance of the logic level indicators will vary directly. The Q and $\overline{Q}$ indicators will illuminate equally regardless of the pulse train duty cycle unless the duty cycle is within the response time of the human eye. Then the indicators will appear to consecutively wink on and off.

An irregular high-frequency pulse train of, for example, 1,000 pulses per second or greater can easily be identified through the use of the Q and $\overline{Q}$ indicators. The irregular pulse train will cause one of the indicators to be illuminated longer than the other causing a relative shift in brilliance between the two indicators.

The present invention by way of the logic level indicator also provides a means of detecting marginal signal levels within the circuit under test. For example the threshold trigger level of the logic level circuit is greater than that of the JK flip-flop. Thus, signals which trigger the Q and $\overline{Q}$ indicators but do not affect the logic "1" and "0" indicators are marginal in amplitude and could be the cause of erratic operation.

If it is desired to reduce the probe's triggering threshold one or two diodes may be connected in series with the probe tip. A forward voltage drop across each diode decreases the threshold triggering level approximately 0.6 volts per diode.

Another alternate circuit construction is in the provision of the +V power supply. In order to provide a larger operating voltages a zener diode bridge may be provided which, for example, allows the voltage range of +V to be from 3 to 35 volts.

Thus, the self-contained probe of the present invention provides for fast response to the signals of the high-speed logic circuits of today and delineates characteristics of these signals in an easy and economical manner. For example, with the four indicators located conveniently in the barrel portion of the probe the operator which would normally have his eyes placed on the circuit under test easily observes the indications of the light sources.

We claim:

1. A self-contained probe for delineating the characteristics of a logic circuit signal being monitored comprising: first and second indicating means contained in said probe for indicating the logic level of said signal; means contained in said probe for driving said indicating means including means for actuating one of said indicating means when said signal is greater than a predetermined level and for actuating said other indicating means when said signal is less than said level; third and fourth indicating means contained in said probe for indicating a change in the logic level of said signal; and means contained in said probe for driving said third and fourth indicating means including bistable means for alternately actuating such indicating means only in response to a change in said logic level from a first logic level to a second logic level.

2. A self-contained probe as in claim 1 where said alternate actuation bistable means includes a flip-flop.

3. A self-contained probe as in claim 2 where said flip-flop is of the JK-type having a response of at least 5 nanoseconds.

4. A self-contained probe as in claim 1 where the response to a change of logic level of said means for driving said third and fourth indicating means is at least an order of magnitude faster than the response of said first and second indicating means to said change in logic level.

5. A self-contained probe as in claim 1 where said means for driving said first and second indicating means is monostable.

6. A self-contained probe as in claim 1 where said first and second indicating means represent "0" and "1" logic levels and said third and fourth indicating means represent "Q" and "$\overline{Q}$" change of logic level.

7. A self-contained probe in claim 1 together with a conductive probe tip extending from the end of said probe adapted for contacting a circuit to be tested.

8. A self-contained probe as in claim 7 together with a fuse contained in said probe directly coupled to said probe tip.

9. A self-contained probe as in claim 1 where said indicating means are light sources and said actuating means for said first and second light sources includes an inverter series connected therebetween and said actuating means for said third and fourth light sources includes an inverter series connected therebetween.

10. A self-contained probe as in claim 9 where said actuating means for said third and fourth indicators includes a flip-flop having an output coupled to said inverter connected between such indicators.

11. A self-contained probe as in claim 1 where said indicators are light-emitting diodes.

12. A self-contained probe as in claim 1 where said probe includes a barrel portion having four windows for respectively exposing said indicating means.

13. A self-contained probe for delineating the characteristics of a logic circuit signal being monitored comprising: first indicating means having two conditions contained in said probe for indicating the logic level of said signal; means contained in said probe for driving said indicating means for placing said indicating means in one of said conditions when said signal is greater than a predetermined level and for placing said indicating means in the other of said conditions when said signal is less than said level; second indicating means having two conditions contained in said probe for indicating a change in the logic level of said signal; and means contained in said probe for driving said change of level indicating means including bistable means for switching such indicating means between said two conditions only in response to a change in said logic level from a first logic level to a second logic level.

* * * * *